(12) United States Patent
Waki et al.

(10) Patent No.: US 8,123,409 B2
(45) Date of Patent: Feb. 28, 2012

(54) JOURNAL BEARING

(75) Inventors: Yuichiro Waki, Tokyo (JP); Takashi Nakano, Tokyo (JP); Shingo Yamasue, Hyogo (JP); Shingo Tanaka, Hyogo (JP); Takaaki Kaikogi, Hyogo (JP); Kazuharu Hirokawa, Hyogo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 221 days.

(21) Appl. No.: 12/623,704

(22) Filed: Nov. 23, 2009

(65) Prior Publication Data

US 2010/0220944 A1 Sep. 2, 2010

(30) Foreign Application Priority Data

Feb. 27, 2009 (JP) ................... 2009-047355

(51) Int. Cl.
   *F16C 32/06* (2006.01)
   *F16C 13/00* (2006.01)
   *F16N 1/00* (2006.01)
(52) U.S. Cl. .................... 384/368; 384/122; 384/418
(58) Field of Classification Search .......... 384/122, 384/215, 308–309, 311–313, 316, 368, 418, 384/438
   See application file for complete search history.

(56) References Cited

U.S. PATENT DOCUMENTS

| 3,549,215 | A | * | 12/1970 | Hollingsworth | 384/117 |
| 3,807,814 | A | * | 4/1974 | Stopp | 384/312 |
| 4,097,094 | A | * | 6/1978 | Gardner | 384/215 |
| 4,686,403 | A |   | 8/1987 | Hackstie et al. |  |
| 5,743,657 | A | * | 4/1998 | O'Reilly et al. | 384/312 |
| 6,176,619 | B1 | * | 1/2001 | Nagasaka et al. | 384/292 |

FOREIGN PATENT DOCUMENTS

| JP | 63-133852 |   | 6/1988 |
| JP | 63-132114 |   | 8/1988 |
| JP | 3-062223 |   | 6/1991 |
| JP | 5-332355 |   | 12/1993 |
| JP | 05332355 | A * | 12/1993 |
| JP | 09133127 | A * | 5/1997 |
| JP | 11-182535 |   | 7/1999 |
| JP | 2000274432 | A * | 10/2000 |
| JP | 2001-165152 |   | 6/2001 |
| JP | 2001165152 | A * | 6/2001 |
| JP | 2006-234147 |   | 9/2006 |

* cited by examiner

*Primary Examiner* — Marcus Charles
(74) *Attorney, Agent, or Firm* — Wenderoth, Lind & Ponack, L.L.P.

(57) ABSTRACT

A journal bearing has a plurality of pad stops which include a first pad stop located at a most forward position in the rotation direction of the rotation shaft, and the pad stops other than the first pad stop function as oiling nozzles for releasing lubricating oil between the outer circumferential surface of the rotation shaft and the inner circumferential surfaces of the pads.

4 Claims, 3 Drawing Sheets

JOURNAL BEARING

BACKGROUND OF THE INVENTION

1. Field of the Invention

The present invention relates to a journal bearing for use in rotating machines such as a steam turbine, a gas turbine, a blower, and a compressor.

This application is based on Japanese Patent Application No. 2009-047355, the content of which is incorporated herein by reference.

2. Description of Related Art

A journal bearing disclosed in Japanese Unexamined Utility Model Application, Publication No. Sho 63-132114 is known as an example of a journal bearing for use in rotating machines such as a steam turbine, a gas turbine, a blower, and a compressor.

BRIEF SUMMARY OF THE INVENTION

Recently, a journal bearing has been proposed in which a plurality of (for example, four) pads are arranged radially inside a carrier ring along the circumferential direction (more specifically, a plurality of (for example, two) pads are arranged radially inside an upper half of the carrier ring (upper half of the mainframe) along the circumferential direction, and a plurality of (for example, two) pads are arranged radially inside a lower half of the carrier ring (lower half of the mainframe) along the circumferential direction), while a total of eight oiling nozzles are arranged by having each one of these nozzles arranged at every opposite end of the respective pads.

However, in such a journal bearing, since lubricating oil is released (supplied) from the oiling nozzles attached to the upper half of the carrier ring which does not receive any load (which is not loaded), the oil is prone to be oversupplied. This leads to a problem of an increase in the churning loss between the outer circumferential surface of the rotor shaft (rotation shaft) and the inner circumferential surfaces of the pads, causing an increase in the bearing loss.

The present invention was made to address such a situation, with an object of providing a journal bearing capable of reducing the amount of the lubricating oil released (supplied) between the outer circumferential surface of the rotation shaft and the inner circumferential surfaces of the pads, so as to reduce the churning loss between the outer circumferential surface of the rotation shaft and the inner circumferential surfaces of the pads, and to reduce the bearing loss.

In order to achieve the above object, the present invention employs the following solutions.

The journal bearing according to the present invention is a journal bearing which rotatably supports a rotation shaft, and which comprises: a carrier ring including an upper half-carrier ring and a lower half-carrier ring; a plurality of pads arranged radially inside the lower half-carrier ring at intervals, for receiving load from the rotation shaft; and a plurality of pad stops respectively arranged at the circumferentially opposite ends of the respective pads, for restraining circumferential movements of the respective pads, wherein, among these pad stops, the pad stops other than the pad stop located in the most forward position in the axial rotation direction of the rotation shaft have functions as oiling nozzles for releasing lubricating oil between the outer circumferential surface of the rotation shaft and the inner circumferential surfaces of the pads.

According to the journal bearing of the present invention, the number of the pad stops which have functions as oiling nozzles for releasing lubricating oil between the outer circumferential surface of the rotation shaft and the inner circumferential surfaces of the pads can be reduced by half or less as compared to conventional cases. This leads to a reduction in the amount of the lubricating oil to be released (supplied) between the outer circumferential surface of the rotation shaft and the inner circumferential surfaces of the pads (for example, 35% reduction).

By so doing, the churning loss between the outer circumferential surface of the rotation shaft and the inner circumferential surfaces of the pads can be reduced, and the bearing loss can also be reduced.

The above-mentioned journal bearing is more preferably configured such that equal amounts of the lubricating oil can be released from the respective pad stops having functions as oiling nozzles.

According to such a journal bearing, there is no need of adjusting (setting) the amount of oil for each one of the pad stops (oiling nozzles). Therefore, the configuration and the structure can be simplified, and the production cost can also be reduced.

The above-mentioned journal bearing is more preferably configured such that the pad stop located in the most forward position in the axial rotation direction of the rotation shaft releases a smaller amount of the lubricating oil than the oil amount released from any one of the other pad stops, so as to cool down the lubricating oil within the bearing.

According to such a journal bearing, while reducing the amount of lubricating oil to be supplied as a whole, the oil temperature can be kept low and the bearing can be kept sound.

The rotating machine according to the present invention comprises a journal bearing capable of reducing the amount of lubricating oil to be released (supplied) between the outer circumferential surface of the rotation shaft and the inner circumferential surfaces of the pads (for example, 35% reduction).

According to the rotating machine of the present invention, when the rotating machine is horizontally placed so that the bearing load can work downward only, the churning loss between the outer circumferential surface of the rotation shaft and the inner circumferential surfaces of the pads can be reduced, and the bearing loss can also be reduced.

The present invention can offer an effect of reducing the amount of lubricating oil released (supplied) between the outer circumferential surface of the rotation shaft and the inner circumferential surfaces of the pads, so as to reduce the churning loss between the outer circumferential surface of the rotation shaft and the inner circumferential surfaces of the pads, and to reduce the bearing loss.

DETAILED DESCRIPTION OF THE INVENTION

Figure 1:
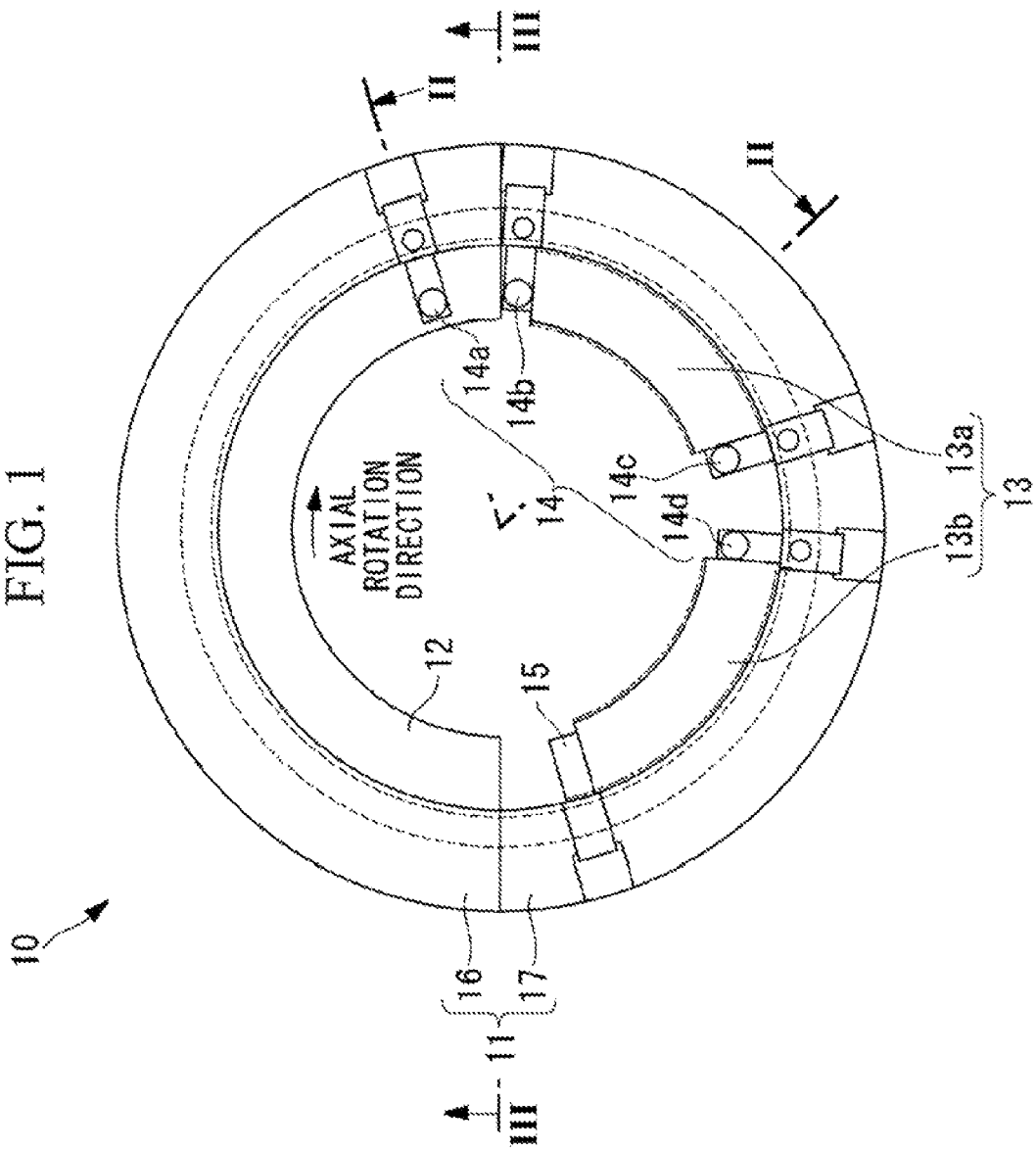
FIG. 1 is a front view of a journal bearing according to one embodiment of the present invention.
Figure 2:
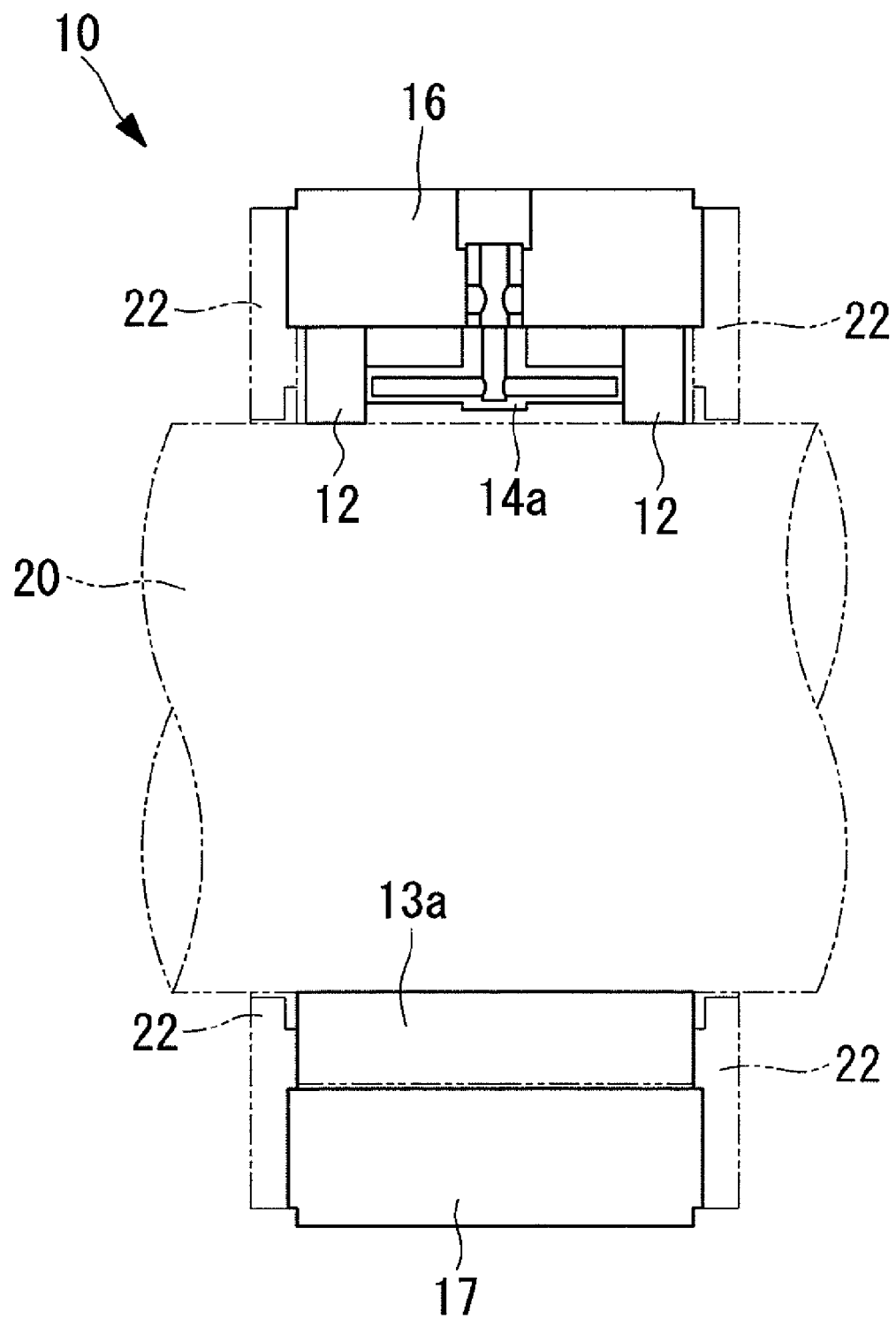
FIG. 2 is a cross sectional view taken along the line II-II of FIG. 1.
Figure 3:
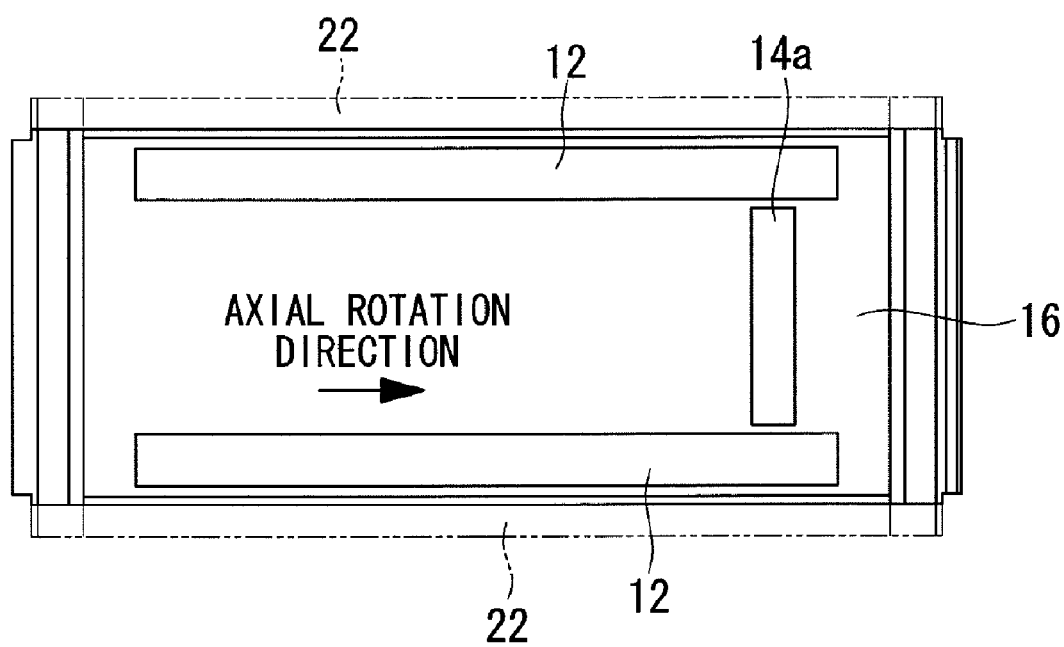
FIG. 3 is a cross sectional view taken along the line III-III of FIG. 1.

Hereafter is a description of one embodiment of a journal bearing according to the present invention, with reference to FIG. 1 through FIG. 3.

FIG. 1 is a front view of the journal bearing according to this embodiment. FIG. 2 is a cross sectional view taken along the line II-II of FIG. 1. FIG. 3 is a cross sectional view taken along the line III-III of FIG. 1.

As shown in FIG. 1, the journal bearing 10 comprises a carrier ring 11, guide metals 12, a plurality of (two in this embodiment) pads 13, a plurality of (four in this embodiment) oiling nozzles (pad stops) 14, and a first pad stop 15, as main components.

The carrier ring 11 comprises an upper half-carrier ring 16 and a lower half-carrier ring 17. The upper half-carrier ring 16 and the lower half-carrier ring 17 are connected via joint bolts (not shown).

As shown in FIG. 2, two guide metals 12 are aligned in the axial direction. As shown in FIG. 1 and FIG. 2, these guide metals 12 are secured to the radially inside of the upper half-carrier ring 16 via bolts (not shown) so that the outer circumferential surfaces thereof can be in contact with the inner circumferential surface of the upper half-carrier ring 16. These guide metals 12 are not for supporting the load from the rotor shaft (rotation shaft) 20, but merely for preventing the leaping behavior of the rotor shaft 20.

As shown in FIG. 1, the pad 13 comprises an upstream pad 13a located on the backward side in the axial rotation direction of the rotor shaft 20, and a downstream pad 13b located on the forward side in the axial rotation direction of the rotor shaft 20. The upstream pad 13a and the downstream pad 13b are arranged side by side along the circumferential direction, and are made of, for example, W87 (white metal) or S25C. In addition, the upstream pad 13a and the downstream pad 13b have their outer circumferential surfaces contacted with the inner circumferential surface of the lower half-carrier ring 17, and are attached to the radially inside of the lower half-carrier ring 17 so that a predetermined space is formed (provided) between the upstream pad 13a and the downstream pad 13b. These pads 13a and 13b have a tilting mechanism.

The oiling nozzles 14 are for releasing (supplying), for example, lubricating oil that has been supplied from the bottom side, to a space between the outer circumferential surface of the rotor shaft 20 (refer to FIG. 2) and the inner circumferential surfaces of the pads 13, and consists of: a (first) oiling nozzle 14a arranged at one ends of the guide metals 12 (the ends on the downstream side which are located on the forward side in the axial rotation direction of the rotor shaft 20); a (second) oiling nozzle 14b and a (third) oiling nozzle 14c arranged at opposite ends of the upstream pad 13a (the end on the upstream side which is located on the backward side in the axial rotation direction of the rotor shaft 20 and the end on the downstream side which is located on the forward side in the axial rotation direction of the rotor shaft 20); and a (fourth) oiling nozzle 14d arranged at one end of the downstream pad 13b (the end on the upstream side which is located on the backward side in the axial rotation direction of the rotor shaft 20). Moreover, this embodiment is designed so that equal amounts of the lubricating oil can be released from the respective oiling nozzles 14a, 14b, 14c, and 14d, that is to say, so that the lubricating oil at an amount accounting for 25% of the total flowing quantity can be equally supplied from each of the oiling nozzles 14a, 14b, 14c, and 14d.

Each of the oiling nozzles 14b, 14c, and 14d has a function as a pad stop (stopper), so that the circumferential movement of the upstream pad 13a can be restrained (limited) by the oiling nozzles 14b and 14c, and the circumferential movement of the downstream pad 13b can be restrained (limited) by the oiling nozzle 14d and the first pad stop 15.

In addition, the axial movements of the upstream pad 13a and the downstream pad 13b can be restrained (limited) by side plates 22 which are secured to opposite end faces of the lower half-carrier ring 17 via locking screws (not shown).

The oiling nozzle is not only limited to the structure integrated with the pad stop, but also includes structures in which the oiling nozzle and the pad stop are formed as separate bodies at adjacent positions.

According to the journal bearing 10 of this embodiment, the oiling nozzles 14a, 14b, 14c, and 14d for releasing lubricating oil between the outer circumferential surface of the rotor shaft 20 and the inner circumferential surfaces of the pads 13 are arranged only one ends of the guide metals 12, the opposite ends of the upstream pad 13a, and one end of the downstream pad 13b. Therefore, the number of the oiling nozzles 14a, 14b, 14c, and 14d can be reduced by half or less as compared to conventional cases. This leads to a reduction in the amount of the lubricating oil to be released between the outer circumferential surface of the rotor shaft 20 and the inner circumferential surfaces of the pads 13 (for example, 35% reduction).

By so doing, the churning loss between the outer circumferential surface of the rotor shaft 20 and the inner circumferential surfaces of the pads 13 can be reduced, and the bearing loss can also be reduced.

In addition, according to the journal bearing 10 of this embodiment, equal amounts of the lubricating oil can be released from the respective oiling nozzles 14a, 14b, 14c, and 14d.

By so doing, there is no need of adjusting (setting) the amount of oil for each one of the oiling nozzles 14a, 14b, 14c, and 14d. Therefore, the configuration and the structure can be simplified, and the production cost can also be reduced.

The present invention is not limited to the embodiment described above, but can be variously modified or changed without departing from the gist of the present invention.

For example, the oiling nozzle 14a may be removed (omitted) so that the lubricating oil at an amount accounting for 50% of the total flowing quantity can be supplied from the oiling nozzle 14b.

Moreover, the first pad stop 15 takes a structure which supplies no oil in order to reduce the amount of the lubricating oil. However, the pad stop 15 may be provided with an oiling nozzle to be able to supply oil. By having such a structure, the pad stop 15 can also be used as a cooling sprayer which lowers the oil temperature.

What is claimed is:

1. A journal bearing to be used for a rotating machine horizontally placed so that a bearing load works downward only, the journal bearing being adapted to rotatably support a rotation shaft which rotates in a rotation direction, and the journal bearing comprising:
    a carrier ring including an upper half-carrier ring and a lower half-carrier ring;
    a plurality of pads arranged radially only inside the lower half-carrier ring at intervals, for receiving load from the rotation shaft; and
    a plurality of pad stops respectively arranged at circumferentially opposite ends of the respective pads, for restraining circumferential movements of the respective pads,
    wherein the plurality of pad stops includes a first pad stop located at a most forward position in the rotation direction of the rotation shaft,
    wherein the pad stops other than the first pad stop function as oiling nozzles for releasing lubricating oil between the outer circumferential surface of the rotation shaft and the inner circumferential surfaces of the pads.

2. A journal bearing according to claim 1, wherein equal amounts of the lubricating oil can be released from the respective pad stops which function as oiling nozzles.

3. A journal bearing according to claim 1, wherein the first pad stop functions as an oiling nozzle which releases a smaller amount of the lubricating oil than the oil amount released from any one of the other pad stops, so as to cool down the lubricating oil within the bearing.

4. A rotating machine comprising the journal bearing according to claim 1.

* * * * *